(12) United States Patent
Adi

(10) Patent No.: US 6,664,659 B1
(45) Date of Patent: Dec. 16, 2003

(54) CATV AMPLIFIER POWER SUPPLY REDUNDANCY

(75) Inventor: Vinitkumar S. Adi, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 694 days.

(21) Appl. No.: 09/609,723

(22) Filed: Jul. 3, 2000

(51) Int. Cl.[7] ............................................... H02M 7/00
(52) U.S. Cl. ............................................ 307/64; 363/65
(58) Field of Search ........................... 307/130, 44, 64, 307/65, 71; 340/333; 363/65, 34, 72, 70

(56) References Cited

U.S. PATENT DOCUMENTS

| | | | |
|---|---|---|---|
| 4,734,844 A | * 3/1988 | Rhoads | 363/72 |
| 5,740,023 A | * 4/1998 | Brooke et al. | 363/65 |
| 6,253,330 B1 | * 6/2001 | Denkin et al. | 713/300 |
| 6,301,133 B1 | * 10/2001 | Cuadra et al. | 363/65 |

\* cited by examiner

Primary Examiner—Gregory J. Toatley, Jr.
(74) Attorney, Agent, or Firm—Kenneth M. Massaroni; Hubert J. Barnhardt, III; Shelley L. Couturier

(57) ABSTRACT

A power supply system that provides redundant power by automatically selecting one power supply as the master power supply. Power supplies configured in parallel share load. The load voltage of the power supply is compared to a reference voltage producing output errors. The error is amplified and compared with the peak switch currents to determine the pulse width of the power supply switch. The power supply with the highest error voltage controls a shared bus and thus become the master. The remaining power supply (or power supplies) having a lower error voltage becomes (or became) the slave power supply. Thus, the system automatically provides redundancy with one power supply operating as the master and the remaining ones as the slave power supplies. Due to the common shared bus, all the paralleled power supplies have the same peak currents through their switch and to the load. In an alternative embodiment, one power supply can be pre-set as the master power supply with the remaining power supplies functioning as slave power supplies.

20 Claims, 3 Drawing Sheets

CATV AMPLIFIER POWER SUPPLY REDUNDANCY

FIELD OF THE INVENTION

This invention relates to power supply systems, and more particularly, to cable television (CATV) amplifier power supply redundancy.

BACKGROUND OF THE INVENTION

Communication systems are used to transmit and deliver information to consumers in a variety of ways. These systems include satellite, cellular, and wireline networks and the information can be virtually anything, from analog to digital and incorporating telephony, video, data, etc. Due to signal losses inherent in the transmission of signals over great distances, amplifiers are often necessary to boost the signal level. The amplifiers ensure that signals are at the proper power level as they pass through and out of the network. Maintaining the signals at a constant power level is important for many systems, such as cable television systems. Further, a loss of power can be devastating to service providers.

Cable television (CATV) systems provide content to subscribers, typically by routing signals from a satellite to a subscriber utilizing communication systems such as fiber optic cables and/or coaxial cables. FIG. 1 shows an example of a cable television system 10 including a satellite 12 transmitting signals to a headend 14 that receives and demodulates the signals to baseband. The baseband signal is transmitted over the communication system after conversion to an optical signal or a radio frequency. As illustrated, a fiber optic system 16 transports the optical signal to a hub 18 and then onto a node 20. Amplifiers 22 are normally utilized in the system to increase signal levels. Taps 24 are inserted in the communications system 10 to deliver the signals to subscribers 26.

CATV amplifiers are an important part of the overall CATV system. Constant power should be provided to these amplifiers at all times. Typically, the node 20 has redundant power sources assuring they are never without power in the event of a failure of one of the power supplies. However, the amplifiers do not have a redundant power source. Further, if redundant power was available to amplifiers, keeping the power supplies synchronized would be a challenge.

A master/slave configuration can be utilized to regulate power supplies with one power supply configured to control the other power supply or power supplies. Conventional power supply master/slave configurations involve power supplies operating in parallel with one power supply preset as the master and one as the slave. Power levels can be maintained by sensing output currents. However, in the event of a failure, conventional systems do not provide automatic redundancy where one power supply is automatically selected as the master and the other as the slave.

Accordingly, a need exists for systems and methods for efficiently providing redundant power to CATV amplifiers and for automatically selecting one power supply as the master power supply and one as the slave power supply.

DETAILED DESCRIPTION

Figure 2:
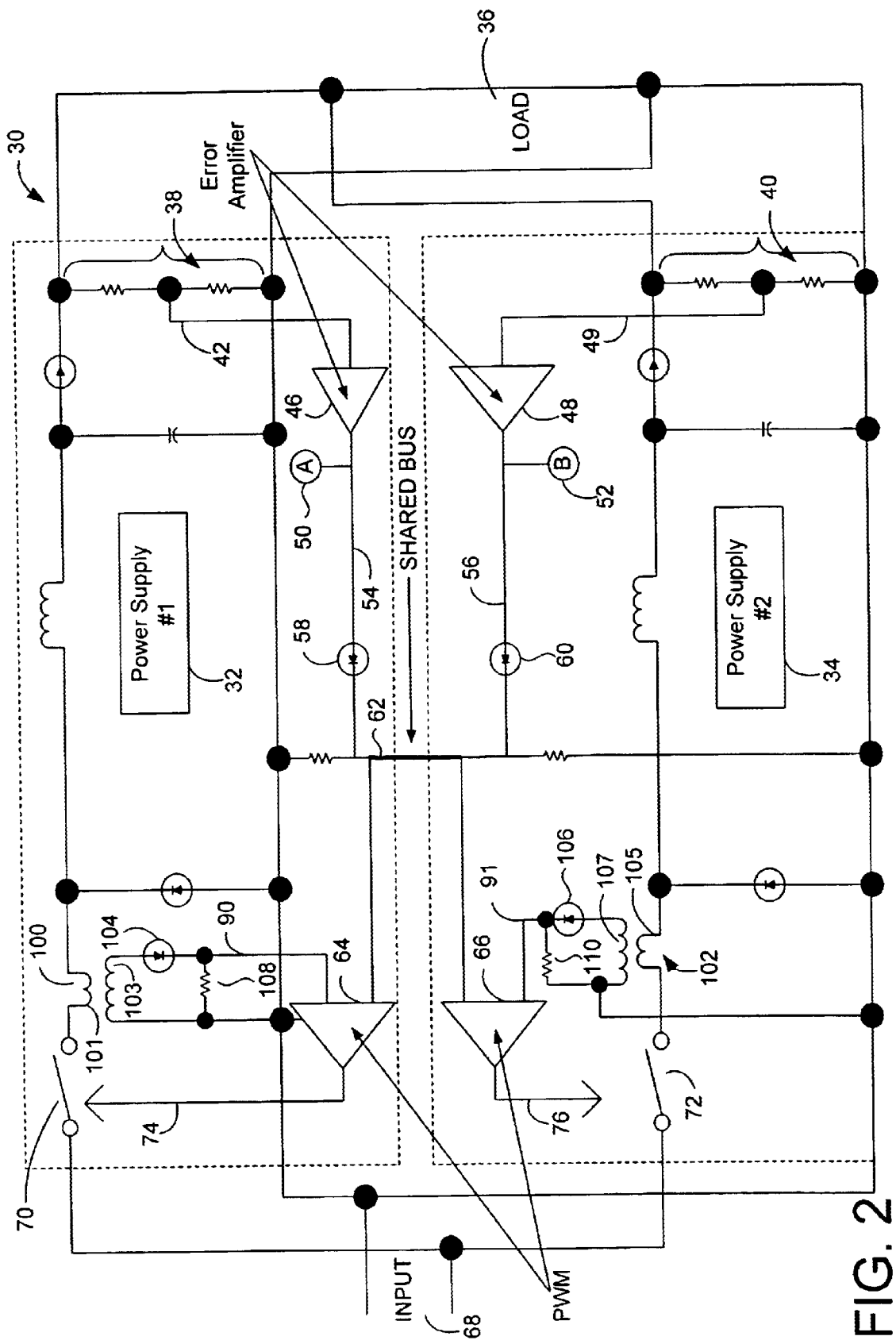
FIG. 2 shows a schematic diagram of a power supply configuration providing automatic redundancy in accordance with this invention.
Figure 3:
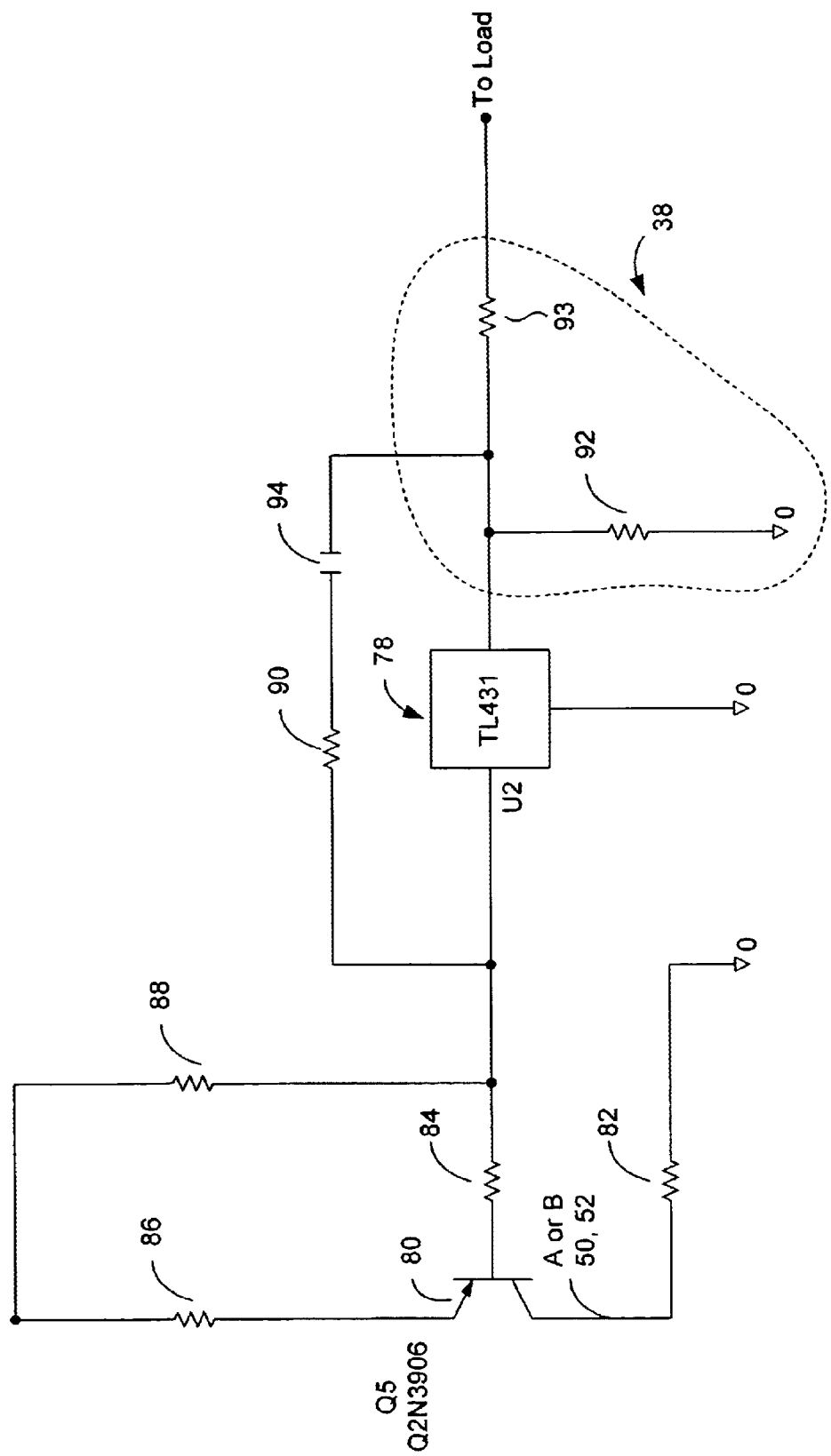
FIG. 3 shows a detailed schematic diagram of the error amplifier of FIG. 2.

FIGS. 2 and 3 show various aspects of a power supply configuration according to this invention.

Figure 1:
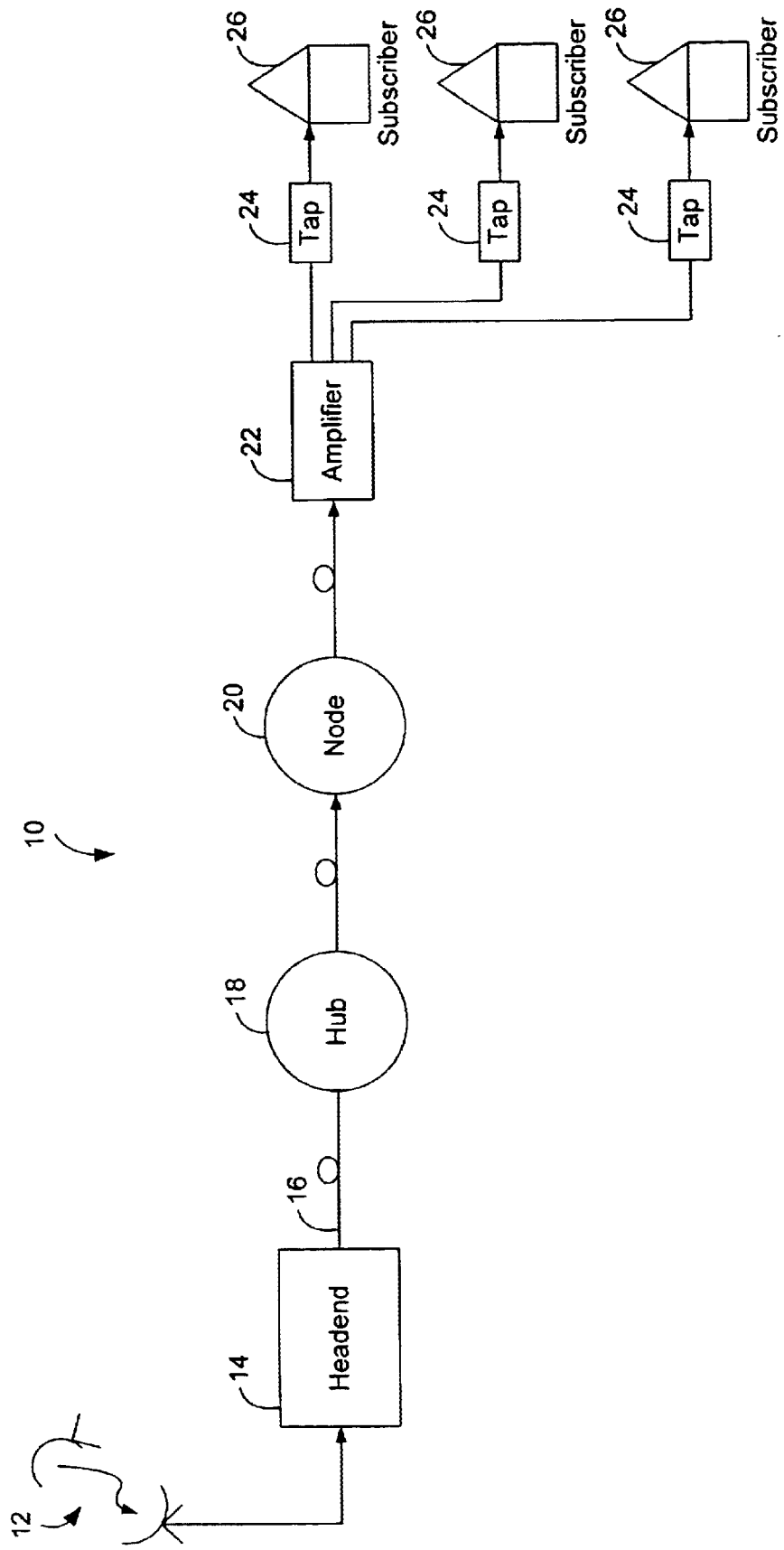
FIG. 1 shows a block diagram of a conventional cable television system.

As discussed in the Background of the Invention section in reference to FIG. 1, CATV systems 10 process satellite signals through a transmission network and ultimately are received by subscribers 26. Cable service providers strive to provide a high quality signal to their subscribers 26. Amplifiers 22 increase the signal level along the communications system 10 where needed.

Redundant power supplies serve as one source to assure that the amplifiers or other system components remain in service. In the event of a failure of the master power supply, a slave power supply provides critical power to the amplifiers 22. Or in the event of a failure of the slave power supply, a master power supply provides critical power to the amplifier 22.

FIG. 2 is a schematic diagram of an example of a circuit configuration 30 for providing a redundant power supply configuration that automatically selects one of the power supplies as the master power supply in accordance with this invention. FIG. 2 shows two power supplies 32, 34, however, this invention is not limited to only two power supplies.

An amplified error voltage 54, 56 results from the comparison of a system provided reference voltage and a scaled load voltage 36 by voltage divider circuits 38, 40. Errors can result from tolerances of resistors in the voltage divider circuits 38, 40 or the variations within the specified amplifiers. An error amplifier 46, 48 amplifies the error, for instance, 50 times or 100 times as needed to provide system stability and the low frequency error rejection.

In an automatic mode, the system 30 automatically selects one power supply 32 or 34 as the master power supply. Both power supplies 32, 34 are on all the time and share half of the power load. If one power supply fails 32 or 34, then the other power supply 32 or 34 picks up the power load from the failed power supply 32 or 34 and provides the total power load.

In the automatic mode, points A and B (50, 52) are ungrounded (also referred to as unused) allowing the amplified error output 54, 56 voltage to pass through a diode 58, 60. The diode can be, for instance, a diode 58, 60 for performing an OR operation. The highest amplified error voltage 54, 56 from the error amplifiers 46, 48 dictates which diode 58, 60 to turn on. The other output of the error amplifier 54, 56 goes low automatically making it a slave. Thus, the only diode 58, 60 that turns on is the one receiving the highest error voltage at 54, 56.

The error voltage from the turned on diode 58, 60 shares its control voltage with other paralleled power supplies (not shown) through the shared bus 62. A transformer 100, 102 senses the current 90, 91 that flows through the switch 70, 72. The primary side 101, 105 of the transformer 100, 102 aligns with the switch 70, 72 and the power supplies 32, 34 and the secondary side 103, 107 of the transformer 100, 102 aligns with a series circuit including a diode 104, 106 and a resistor 108, 110. The shared bus voltage is now compared with the highest (or peak) current sampled at 90, 91 that flows to the switch (70, 72). This comparison determines the required duty cycle for switches 70, 72 for a given operating condition of the power supply 32, 34 with the help of Pulse Width Modulator (PWM) 64, 66. The PWM 64, 66 outputs a waveform that controls the turning on and turning off of the switch 70, 72. A suitable PWM 64, 66 is model UC 2842 from Motorola. Due to the shared bus error voltage between the paralleled power supplies 32, 34, the same peak current through the switch 70,72 is achieved.

The configuration of FIG. 2 provides for an automatic selection of the master power supply. The other power supplies in the loop configuration become the slave power supplies. If the master power supply fails, the system will again select a master power supply from the remaining power supplies. Notification of the failure of a power supply can occur by, for instance, a signal from an amplifier status monitoring system (not shown), to the headend 14. Failures can occur due to, for example, lightening striking a power supply, a defective part causing the power supply to fail, extreme temperature variances affecting components, or the circuit board, or a blown fuse. If the defective power supply is replaced, it can either once again become the master power supply or operate as a slave power supply.

In an alternative embodiment, a user can pre-set the master power supply. Grounding point A 50 or B 52 can force the grounded power supply to become the slave power supply. Current from the ungrounded diode 58 or 60 traverses to the shared bus 62 causing the power supply associated with the ungrounded diode 58 or 60 to become the master power supply. Thus, if the user grounds point A 50, then #2 power supply 34 becomes the master power supply and #1 power supply 32 becomes the slave power supply. If the user grounds point B 52, then #1 power supply 32 becomes the master power supply and #2 power supply 34 becomes the slave power supply.

FIG. 3 is a schematic diagram of an example of a circuit configuration for the error amplifier 46, 48 of FIG. 2. The error amplifier circuit provides closed loop stability to each power supply. The error amplifier 46, 48 includes passive components such as resistors and active components such as an amplifier circuit 78 (also referred to as U2) and a transistor 80 (also referred to as Q5). Values for the passive components can vary with the application. Suitable values can include about 1.5 kohms for resistor 82, 10 kohms for resistor 84, 274 ohms for resistor 86, 1 kohms for resistor 88, 50 kohms for resistor 90, 1.82 kohms for resistor 92, 3 kohms for 93, and 0.1$\mu$farads for capacitor 94.

A suitable amplifier for use with this invention is model TL 431 by Motorola, Inc. TL 431 includes an operational amplifier with a built-in reference voltage that is compared to the load voltage 36 such that the same value is maintained for the output and reference voltages. Transistor 80 couples to resistor 82 and develops a voltage across resistor 82. This error voltage across the resistor 82 is applied to the high impedance shared bus 62 through the diode 58, 60 shown in FIG. 2. The power supply with the highest error voltage across resistor 82 gets control of the bus and becomes the master power supply. All the other paralleled supplies become slave power supplies.

In an alternative embodiment, the functions of amplifier 78 and transistor 80 are combined to provide the control circuit capabilities.

In another alternative embodiment, a MOSFET transistor can be utilized instead of transistor 80.

In still another alternative embodiment, the system provided reference voltage used to compare with the output voltage of the power supplies can be a distinct voltage outside of the amplifier 78.

An advantage of this invention is that the system can be utilized with other types of power supplies including, for example, push-pull, fly-back, buck and boost.

Another advantage of this invention is that unlike typical power supply configurations that sense and compare current to control the power supplies, this invention sense output voltage which reduces the number of components required in the control circuit.

In light of the foregoing disclosure of this invention and description of certain preferred embodiments, those who are skilled in this area of technology will readily understand that various modifications and adaptations can be made without departing from the true scope and spirit of this invention. All such modifications and adaptations are intended to be covered by the following claims.

What is claimed is:

1. A system for providing redundant power from at least two power supplies configured in parallel and sharing a load, comprising:

an error amplifier circuit for comparing a load voltage and a reference voltage and producing an amplified error voltage for each of the paralleled power supplies wherein one of the amplified error voltage is a higher error voltage;

a diode coupled to each amplified error voltage wherein the diode receiving the higher error voltage turns on; and a Pulse Width Modulator (PWM) which limits a peak current through a switch coupled to each of the power supplies by adjusting a duty cycle of the switch whereby if one of the paralleled power supplies fails, the parallel power supply with the higher error voltage automatically becomes a master power supply wherein any remaining power supplies become slave power supplies.

2. The system of claim 1, wherein the diode comprises an OR'ing diode.

3. The system of claim 1, further comprising a shared bus coupled between the diode and the PWM for sharing a common error voltage with the paralleled power supplies such that all of the paralleled power supplies deliver the same peak current through their respective switches.

4. The system of claim 1, wherein each error amplifier circuit further comprises an output sensing circuit, operational amplifier and a feedback network for providing closed loop stability to each power supply.

5. The system of claim 4, wherein the operational amplifier further comprises an internal reference voltage that is compared to the load voltage such that the same voltage value is maintained for an output and reference voltages.

6. The system of claim 1, wherein the power supply configuration is selected from the group consisting of:

push-pull;

fly-back; and buck and boost power supply configurations.

7. The system of claim 1, wherein the reference voltage comprises an externally provided voltage.

8. A method for providing automatic redundancy to at least two power supplies configured in parallel, comprising:

comparing a load voltage coupled to each power supply configured in parallel to a reference voltage and producing an error voltages for each power supply;

amplifying each error voltage to produce one amplified error voltage having a higher value than all other amplified error voltages;

switching to a power supply with the highest value amplified error voltage; and limiting a peak current through a switch coupled to each power supply by a pulse width modulator that adjusts a duty cycle of the switch.

9. The method of claim 8, further comprising transmitting a common error voltage to the parallel power supplies using a shared bus such that all of the parallel power supplies deliver the same peak current through their respective switches.

10. The method of claim 8, wherein the comparing a load voltage coupled to each power supply configured in parallel to a reference voltage and producing an error voltage for each power supply is performed using an error amplifier circuit.

11. The method of claim 8, wherein the limiting a peak current through a switch coupled to each power supply by a pulse width modulator that adjusts a duty cycle of the switch is performed using a Pulse Width Modulator (PWM).

12. A communications system, comprising:
   a transmission system for providing a signal from a source to a subscriber;
   an amplifier system coupled to the transmission system for amplifying the signal, the amplifier system further comprising:
      an error amplifier circuit for comparing a load voltage and a reference voltage and producing an amplified error voltage for each of the paralleled power supplies;
      a diode coupled to each amplified error voltage wherein the diode receiving the higher error voltage turns on; and
      a Pulse Width Modulator (PWM) which limits a peak current through a switch coupled to each of the power supplies by adjusting a duty cycle of the switch whereby the power supply with the higher error voltage automatically becomes a master power supply wherein any remaining power supplies become slave power supplies.

13. The system of claim 12, wherein the amplifier system further comprises a shared bus for sharing a common error voltage with the paralleled power supplies such that all of the paralleled power supplies deliver the same peak current through their respective switches.

14. The system of claim 13, wherein each error amplifier circuit further comprises an output sensing circuit, operational amplifier and a feedback network for providing closed loop stability to each power supply.

15. The system of claim 14, wherein the operational amplifier further comprises an internal reference voltage that is compared to the load voltage such that the same voltage value is maintained for an output and reference voltages.

16. A system for pre-selecting a master power supply, comprising:
   a comparator for comparing a load voltage coupled to the power supplies to a reference voltage resulting in an error voltage associated with each power supply;
   amplifiers for amplifying each error voltage;
   a ground connection for grounding all but one error voltage;
   a diode for allowing the power supply with the ungrounded voltage to remain on and function as a master power supply; and
   a modulator for limiting a peak current through a switch coupled to each power supply by adjusting a duty cycle of the switch.

17. The system of claim 16, further comprising a shared bus for sharing a common error voltage with the paralleled power supplies.

18. The system of claim 16, wherein the diode comprises an OR'ing diode.

19. The system of claim 16, wherein the amplifiers further comprises an output sensing circuit, operational amplifier and a feedback network for providing closed loop stability to each power supply.

20. A method for pre-selecting a master power supply, comprising:
   receiving a load voltage by a plurality of comparators that compares the load voltage to a reference voltage and producing an output error voltage for each comparator;
   amplifying each output error voltage;
   grounding all but one output error voltages leaving one output error voltage ungrounded;
   providing the ungrounded output error voltage to a power supply such that the power supply functions as a master power supply; and
   regulating a peak current through a switch coupled to the power supply by adjusting a duty cycle of the switch.

* * * * *